March 29, 1960     J. SKELLERN     2,930,573

HALF BALL VALVES

Filed June 4, 1957

INVENTOR
JOHN SKELLERN

BY
Watson, Cole, Grindle & Watson

ATTORNEYS

United States Patent Office 2,930,573
Patented Mar. 29, 1960

2,930,573

HALF BALL VALVES

John Skellern, Northolt, England, assignor to D. Napier & Son Limited, London, England, a company of Great Britain Application June 4, 1957, Serial No. 663,483

Claims priority, application Great Britain June 20, 1956

3 Claims. (Cl. 251—122)

This invention relates to half ball valves such as are used for controlling the rate of flow of a fluid. In such valves as now in use a half ball is mounted in a concave seating in a movable member the movements of which are required to control the rate of flow, with the flat diametral surface of the half ball squarely facing an orifice through which the fluid flows. In the minimum flow rate position the flat surface of the half ball presses against the orifice and shuts off the flow. In the maximum flow rate position the flat surface of the half ball lies well clear of the orifice so that uninterrupted flow through the orifice is permitted. In intermediate positions the flow is partially restricted by the fluid having to pass through an area equal to the length of the perimeter of the orifice multiplied by the lift of the half ball. In conventional half ball valves the length of the perimeter of the orifice is constant so that the effective area of the restriction is proportional to the lift, up to the maximum flow rate position where this area is approximately equal to the area of the orifice.

Such half ball valves have a variety of uses, one of their most extensive applications being in aircraft fuel systems for controlling bleeds, for instance the bleed from the stroke-adjusting servo motor of a variable-stroke fuel pump.

It is an object of the present invention to provide an improved form of half ball valve which provides a wider range of flow rates than is obtainable with a conventional half ball valve.

In a half ball valve according to the present invention there is a needle of varying cross-section passing through the valve orifice and arranged to move with the half ball.

The needle partly obstructs the orifice and by virtue of its varying cross-section will vary the effective area of the orifice as it moves longitudinally in relation to this orifice. This provides an additional variable, namely orifice area, which is a constant in a conventional half ball valve. Moreover, the needle can be arranged so that it exercises control over the flow rate not only within the range of movement of the half ball which would normally be regarded as the effective range (i.e. the range from complete shut-off up to the point where the lift multiplied by the total perimeter of the flow passage or passages defined by the orifice and the needle approximately equals the total cross-sectional area of the flow passage or passages) but also beyond this range of movement, in which extended range the needle and orifice act as a conventional taper needle orifice, the half ball itself having no appreciable effect on the flow in this extended range.

The invention may be performed in various ways and two particular forms of half ball valve embodying the invention will now be described by way of example with reference to the accompanying drawings, in which.

Figure 1:
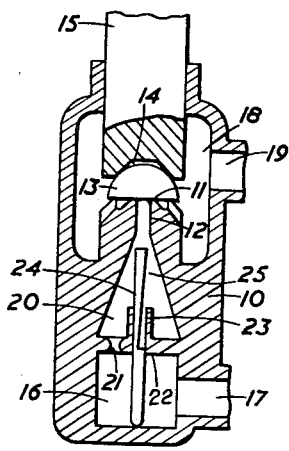
Figure 1 is a sectional elevation of one form of the half ball valve in its closed position.
Figure 2:
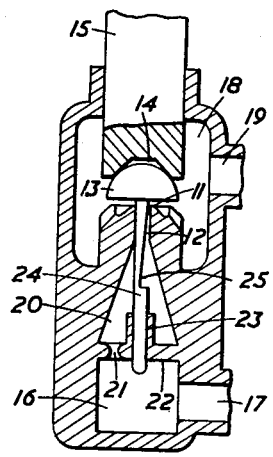
Figure 2 is a sectional elevation of the same valve when open in an intermediate range of operation.
Figure 3:
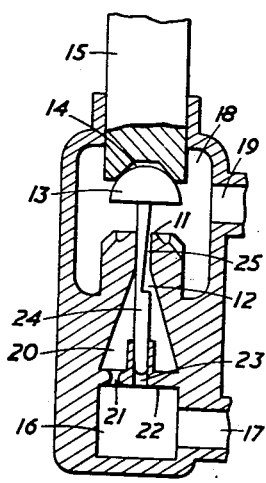
Figure 3 shows the valve of Figures 1 and 2 when open in an extended range of operation.

The valve shown in Figures 1 to 3 comprises a housing 10 containing a flat seating 11 provided with a central aperture 12. A half ball 13 is arranged so that its flat surface co-operates with the flat seating 11, the convex portion of the half ball 13 being accommodated in a concave socket 14 formed in an actuating member 15. The housing 10 includes an inlet chamber 16 communicating with an inlet pipe 17, and an outlet chamber 18 communicating with an outlet pipe 19. Communicating with the underside of the orifice 12 there is a chamber 20 which in turn communicates with the inlet chamber 16 through a restrictor orifice 21. Extending through a partition 22 which separates the chambers 16 and 20 there is a guide bore 23 aligned with the orifice 12. Extending through the orifice 12 and the guide bore 23 there is a needle 24, this needle being urged towards the flat surface of the half ball by the pressure of the fluid in the inlet chamber 16. Thus when the needle member 24 is lowered to the bottom of the chamber 16, its upper end is withdrawn from the orifice 12, so that subsequent opening of the half ball 13 will permit the fluid pressure in the upper chamber 20 to drop below that of that in the lower chamber 16. This lowering of pressure will necessarily arise from the restricted orifice 21 from the chamber 16 into the chamber 20. Therefore, the excess of pressure within the chamber 16 will thrust the needle valve 24 upwardly into the orifice 12 and through it into engagement with the lower surface of the half ball 13. The needle 24 has a varying cross-section as indicated at 25.

The valve illustrated in Figures 1 to 3 operates as follows. When the operating member 15 is in its lowest position in which the valve is closed, the flat surface of the half ball 13 is pressed against the flat seating surface 11, the ball being free to tilt in the socket 14 so that it makes perfect contact with the seating surface so that no fluid can escape from the chamber 20 through the aperture 12 into the outlet chamber 18. If the operating member 15 is raised slightly as shown in Figure 2, to a distance within the range extending from complete shut-off as shown in Figure 1 up to the point where the lift of valve multiplied by the perimeter length of the flow passage defined between the orifice 12 and the needle 24 approximately equals the total cross-sectional area of this flow passage whereby fluid can escape from the chamber 20 into the outlet chamber 18, the flow cross-section of the escape of fluid depends both upon the lift of the half ball 13 and the cross-section of the needle 24 where it emerges from the orifice 12. If the operating member 15 is raised further, i.e. beyond the said range, as shown in Figure 3, the lift of the half ball 13 no longer has any appreciable effect on the flow through the orifice 12, this flow now being determined by the cross-section of the needle 24 where it emerges from the orifice 12.

It will be apparent, therefore, that the cross-sectional area of the needle influences the flow through the valve at all positions of the operating member while the actual lift of the valve influences the flow only in the said range. The variations in the cross-section of the needle can be produced in any suitable manner, conveniently by cutting away portions of a cylindrical needle, as illustrated in Figures 1 to 3, to form a tapering flat surface thereon corresponding to the surface 25. Of course, the variations in the cross-section can be produced in other ways, for instance by making the needle of tapered conical form.

In the construction illustrated in Figures 1 to 3 the guide bore 23 prevents the needle from tilting when parts of reduced cross-section are occupying the orifice 12.

By suitably selecting the size of the restrictor orifice 21 the flow characteristics when the valve is open can be further modified.

Figure 4:
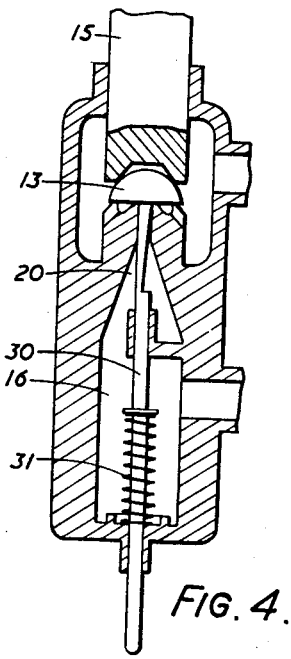
Figure 4 shows another form of half ball valve.

The construction illustrated in Figure 4 shows certain permissible modification. In the first place, there is no restrictor orifice corresponding to the orifice 21 of Figures 1 to 3 so that the chamber 20 is maintained at virtually the same pressure as the inlet chamber 16 at all rates of flow. The second modification comprises biassing the needle 30 towards the half ball 13 by means of a spring 31, to ensure that the needle 30 exactly follows the movements of the half ball 13 even when these movements are very rapid.

What I claim as my invention and desire to secure by Letters Patent is:

1. A half ball valve assembly for controlling flow of a fluid comprising a casing, a flat seating in said casing surrounding an orifice, a half ball having a flat surface and a hemispherical surface and disposed with said flat surface facing said flat seating, an actuating member having a socket receiving said hemispherical surface of said half ball and adapted to move said half ball towards said flat seating, a needle member of varying cross-section separate from said half ball, fluid inlet means to said casing on the same side of said half ball as said needle member, and fluid outlet means from said casing on the opposite side of said half ball from said needle member, means for urging said needle member to extend through said orifice and engage the flat surface of said half ball whenever said half ball is spaced from said seating to permit fluid to flow through said orifice from said inlet means to said outlet means, and said half ball being freely tiltable in said socket relative to said needle member and said flat seating.

2. A half ball valve assembly according to claim 1, in which said means for urging said needle member comprises a partition in said casing between said fluid inlet means and said flat seating, said partition containing a restricted flow control aperture, an extremity of said needle member remote from said half ball being disposed for movement through said partition and exposed to fluid pressure on the side of said partition adjacent said inlet means.

3. A half ball valve assembly for controlling flow of a fluid comprising a casing, a flat seating in said casing surrounding an orifice, a half ball having a flat surface and a hemispherical surface, and disposed with said flat surface facing said flat seating, an actuating member having a socket receiving said hemispherical surface of said half ball and adapted to move said half ball toward said flat seating, a needle member of varying cross-section separate from said half ball, fluid inlet means to said casing on the same side of said half ball as said needle member, and fluid outlet means from said casing on the opposite side of said half ball from said needle member, a spring urging said needle member through said orifice toward engagement with the flat surface of said half ball whenever said half ball is spaced from said seating to permit fluid to flow through said orifice from said inlet means to said outlet means, and said half ball being freely tiltable in said socket relative to said needle member and said flat seating.

References Cited in the file of this patent

UNITED STATES PATENTS

| 45,390 | Cresson | Dec. 13, 1864 |
| 490,955 | Fishburn | Jan. 31, 1893 |
| 665,083 | Friedmann | Jan. 1, 1901 |
| 732,776 | Neumeyer | July 7, 1903 |
| 1,357,667 | Williams | Nov. 2, 1920 |
| 1,619,937 | Huff | Mar. 8, 1927 |
| 1,720,389 | Binks | July 9, 1929 |
| 2,096,202 | Richeson | Oct. 19, 1937 |
| 2,461,909 | McClure | Feb. 15, 1949 |

FOREIGN PATENTS

| 732,530 | France | June 14, 1932 |